United States Patent
Tzoreff et al.

(10) Patent No.: US 9,351,326 B2
(45) Date of Patent: May 24, 2016

(54) ACCESS POINT DISCOVERABILITY IN MULTI-ROLE MULTI-CHANNEL DEVICES

(71) Applicant: Texas Instruments Incorporated, Dallas, TX (US)

(72) Inventors: Yaniv Tzoreff, Jerusalem (IL); Shaul Barner, Shoham (IL); Ronen Birman, Kfar Save (IL)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 219 days.

(21) Appl. No.: 14/160,548

(22) Filed: Jan. 21, 2014

(65) Prior Publication Data

US 2015/0208451 A1 Jul. 23, 2015

(51) Int. Cl.
*H04W 76/02* (2009.01)
*H04W 48/08* (2009.01)
*H04W 48/20* (2009.01)
*H04W 88/06* (2009.01)

(52) U.S. Cl.
CPC ............ *H04W 76/023* (2013.01); *H04W 48/08* (2013.01); *H04W 48/20* (2013.01); *H04W 88/06* (2013.01)

(58) Field of Classification Search
CPC ............ H04W 36/00; H04W 36/0005; H04W 36/0011; H04W 36/0016; H04W 36/16; H04W 48/20; H04W 76/00; H04W 76/02; H04W 76/023
See application file for complete search history.

(56) References Cited

U.S. PATENT DOCUMENTS

| | | | | |
|---|---|---|---|---|
| 2010/0046468 A1* | 2/2010 | Oi | .......................... | H04W 84/20 370/331 |
| 2013/0343350 A1* | 12/2013 | Weinrib | .............. | H04W 56/002 370/336 |
| 2014/0057593 A1* | 2/2014 | Cloutier | ................ | H04W 12/08 455/405 |
| 2015/0065157 A1* | 3/2015 | Homchaudhuri | ... | H04W 72/082 455/452.1 |

* cited by examiner

*Primary Examiner* — Anh Ngoc Nguyen
(74) *Attorney, Agent, or Firm* — Ronald O. Neerings; Frank D. Cimino

(57) ABSTRACT

Systems and methods for improved access point discoverability in multi-role multi-channel devices are described. When the multi-role multi-channel device leaves an AP role and then later returns to the AP role, such as when operating in another role, the multi-role multi-channel device sends a unicast probe response to the stations in a predetermined list. The unicast probe response is transmitted even without receiving a corresponding probe request. If one of the stations on the list is in the area and would like to connect to the AP role, it can complete the connection process using information in the response message.

20 Claims, 7 Drawing Sheets

ACCESS POINT DISCOVERABILITY IN MULTI-ROLE MULTI-CHANNEL DEVICES

BACKGROUND

The IEEE 802.11 standard defines two operating modes for supporting wireless local area networks (WLANs)—an ad hoc mode and an infrastructure mode. In the ad hoc mode, two or more stations (STAs) can recognize each other and establish a peer-to-peer communication without the need of an access point (AP). In the infrastructure mode, there is at least one AP that connects to one or more STAs. The AP and its associated STAs are known as a Basic Service Set (BSS). A STA may use the AP to access resources on a wired network, such as an Internet, local area network (LAN), or intranet. The STA may also use the AP to communicate with other STAs in the same BSS.

New WLAN devices introduce a complex and important feature called multi-role multi-channel. This feature enables a single WLAN device to act as multiple WLAN devices, even on different channels or frequency bands. When the device leaves one channel or band, such as to perform a different role, the original role might suffer from phenomena that are not treated in the 802.11 standard. For example, in one role, a multi-role multi-channel device may act as an AP on a first channel and, in a second role, act as an AP on a second channel or act as a STA on the same or a different channel. When the multi-role multi-channel device leaves an AP role, any STA that attempts to connect to that AP role will not be able to discover it and connect. As a result, the AP absence may cause very long unconnected periods while the STA waits until the multi-role multi-channel device returns to the AP role, if it resumes the AP role at all.

SUMMARY

Embodiments of the invention improve the discoverability of an AP role in a multi-role multi-channel device. When the multi-role multi-channel device leaves the AP role and then later returns to the AP role, such as when operating in another role, the multi-role multi-channel device sends a unicast probe response to the stations in a predetermined list. If one of the stations on the list is in the area and would like to connect to the AP role, it can complete the connection process using information in the response message.

Embodiments of the invention reduce connection time for the multi-role multi-channel device and improve AP discoverability.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

BRIEF DESCRIPTION OF THE DRAWINGS

Figure 1:
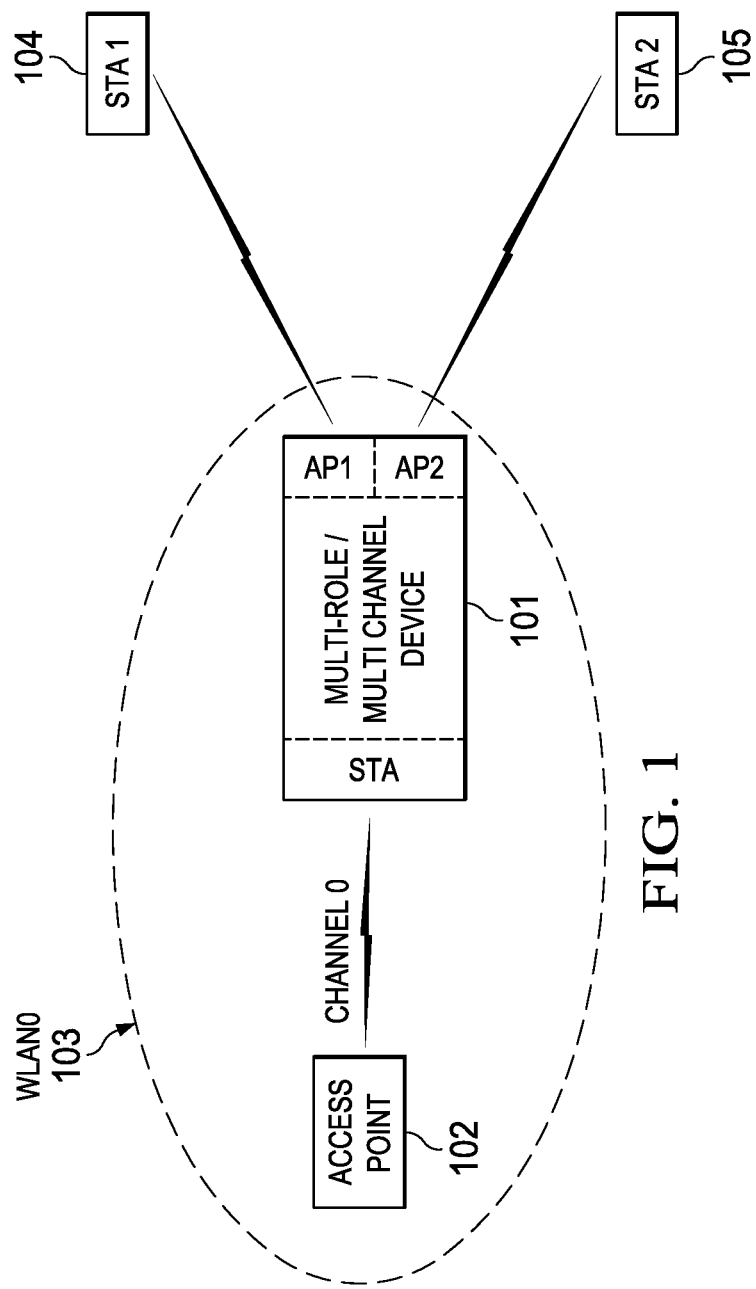

Having thus described the invention(s) in general terms, reference will now be made to the accompanying drawings, wherein:

FIG. 1 illustrates a multi-role multi-channel device that is operating in a station role and is connected to an external access point.

Figure 2:
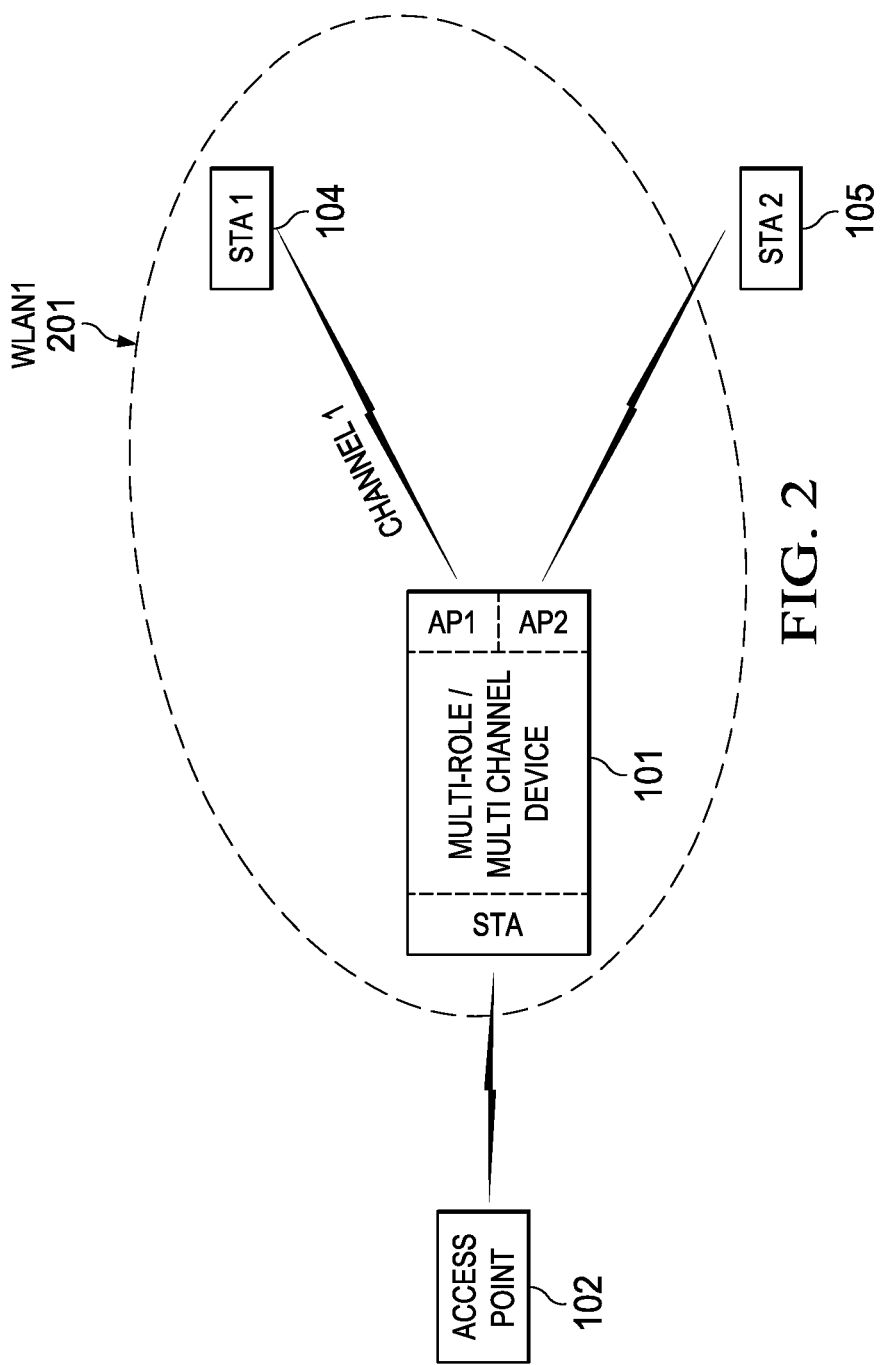

FIG. 2 illustrates a multi-role multi-channel device operating in a first access point role and communicating with an external station.

Figure 3:
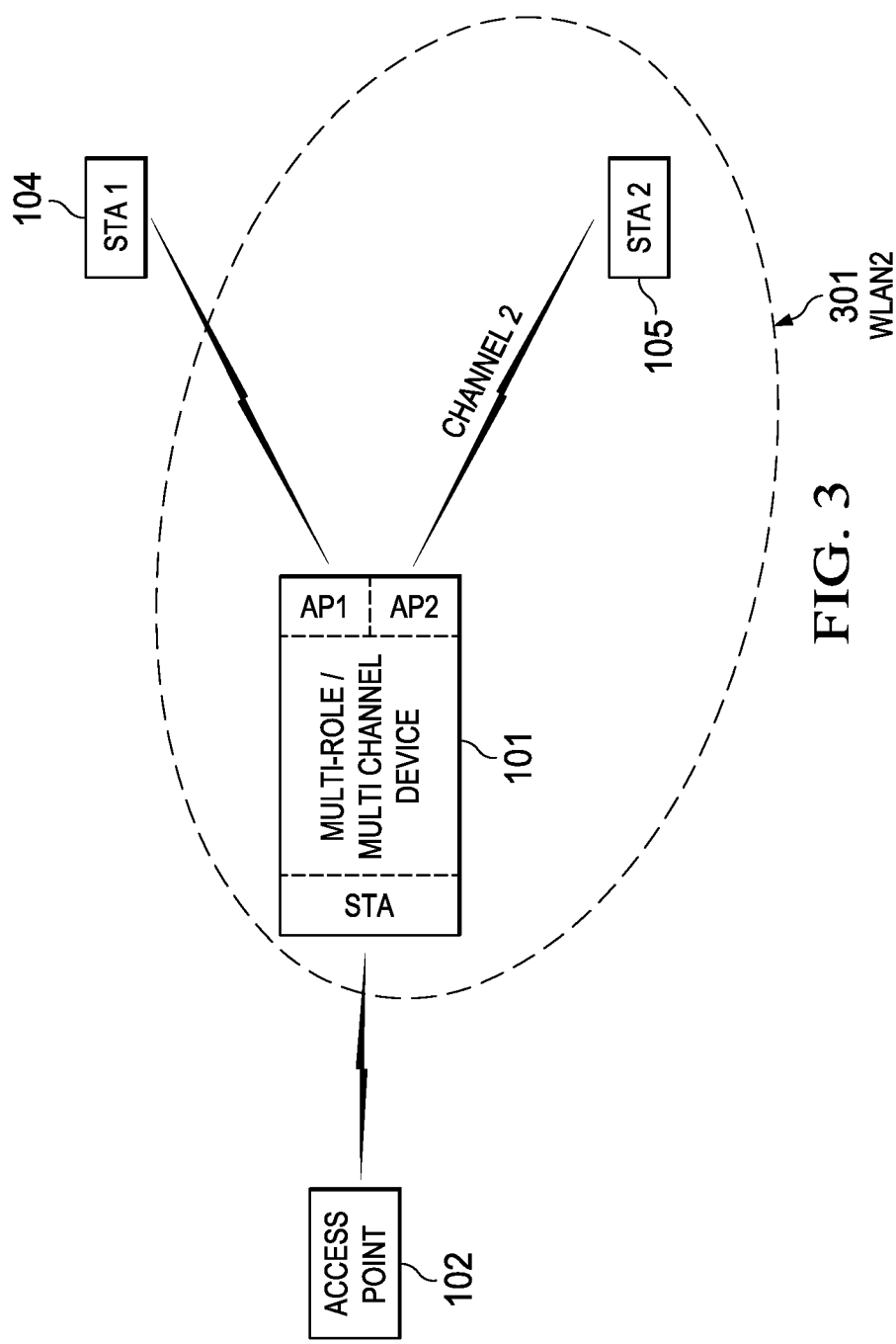

FIG. 3 illustrates a multi-role multi-channel device operating in a second access point role and communicating with an external station.

Figure 4:
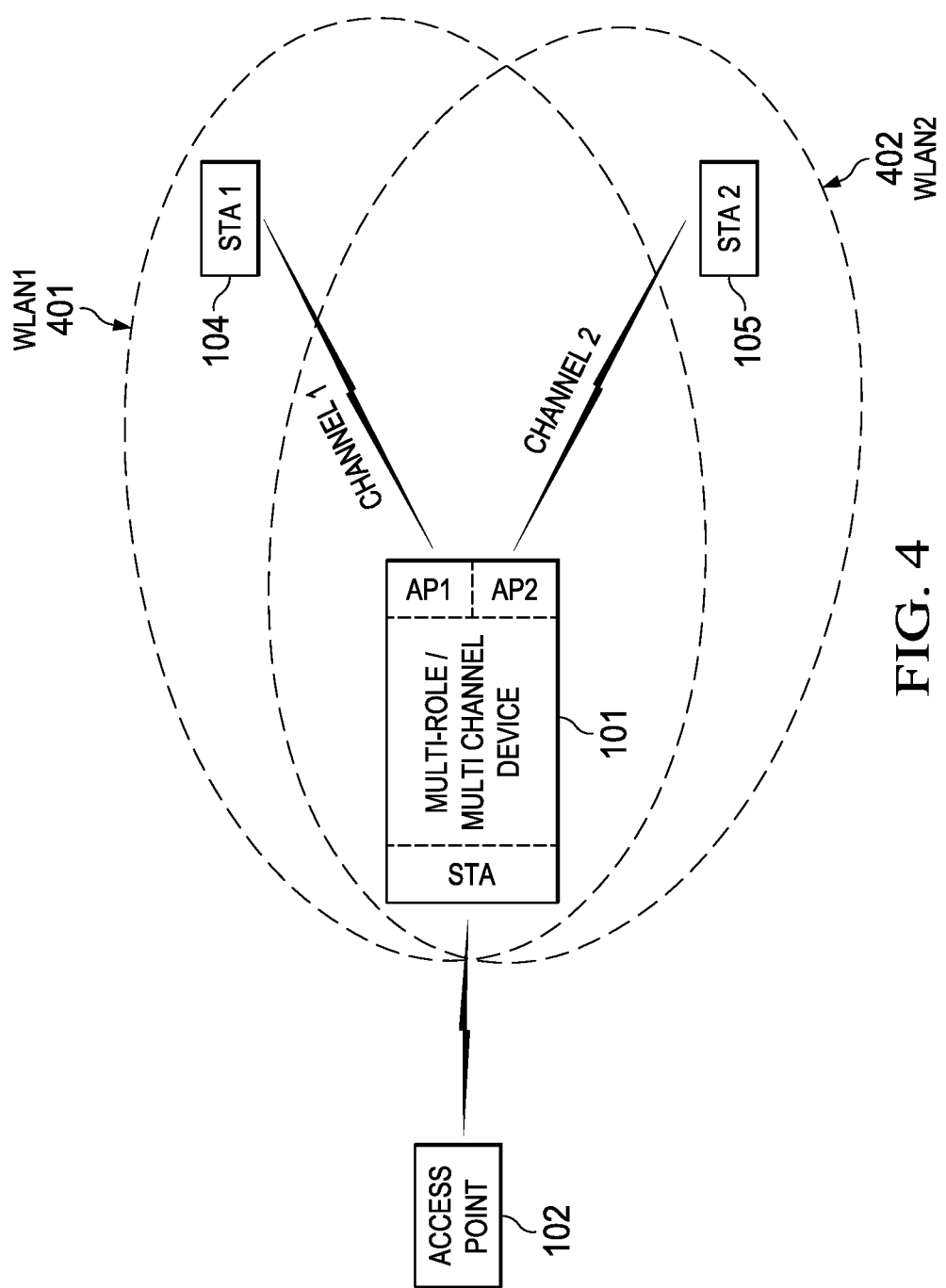

FIG. 4 illustrates a configuration in which a multi-role multi-channel device operates in dual access point roles.

Figure 5:
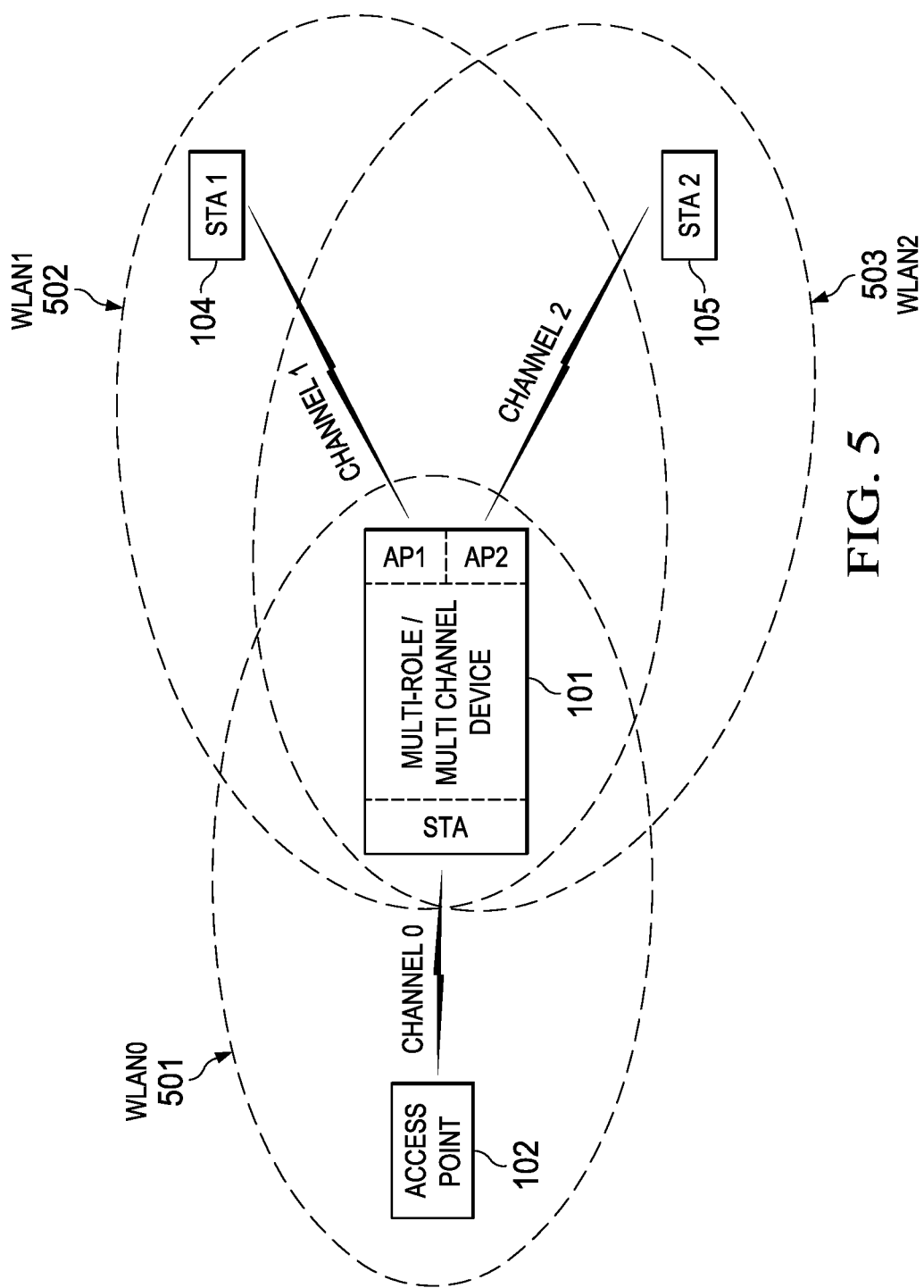

FIG. 5 illustrates a configuration in which multi-role multi-channel device operates in both access point and station roles.

Figure 6:
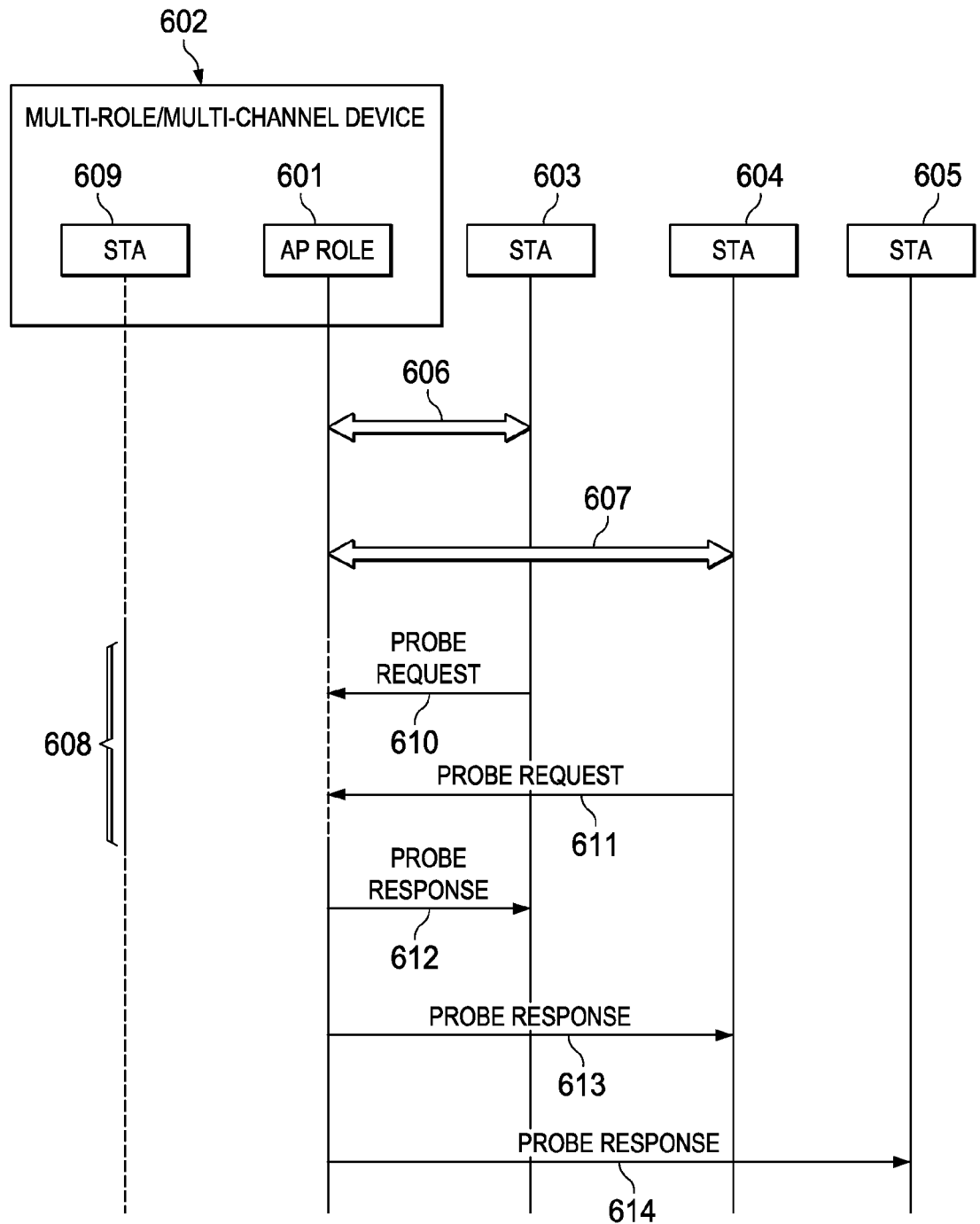

FIG. 6 illustrates messages exchanged with an access point role of a multi-role multi-channel device according to one embodiment.

Figure 7:
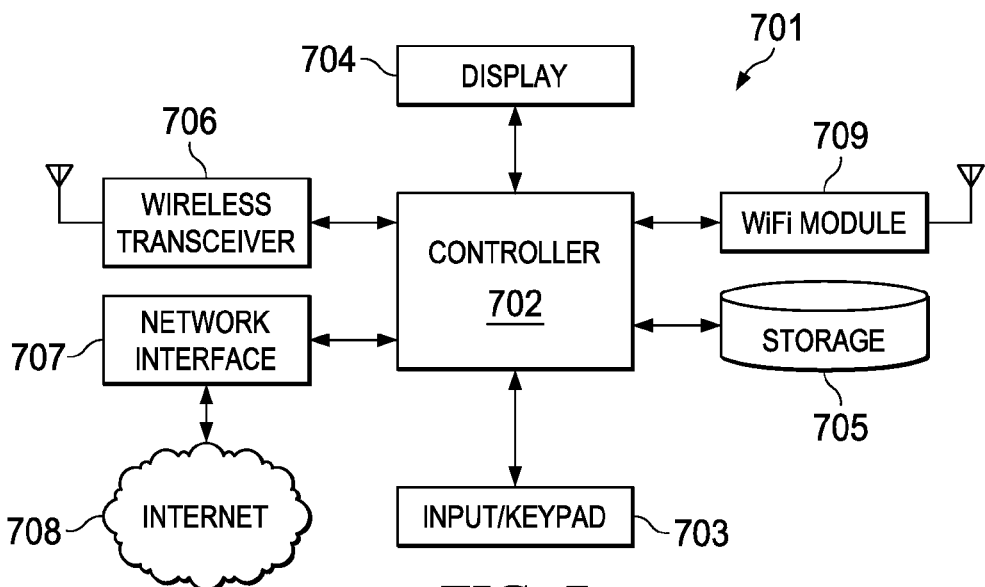

FIG. 7 is a block diagram of a multi-role multi-channel device according to one embodiment of the invention.

Figure 8:
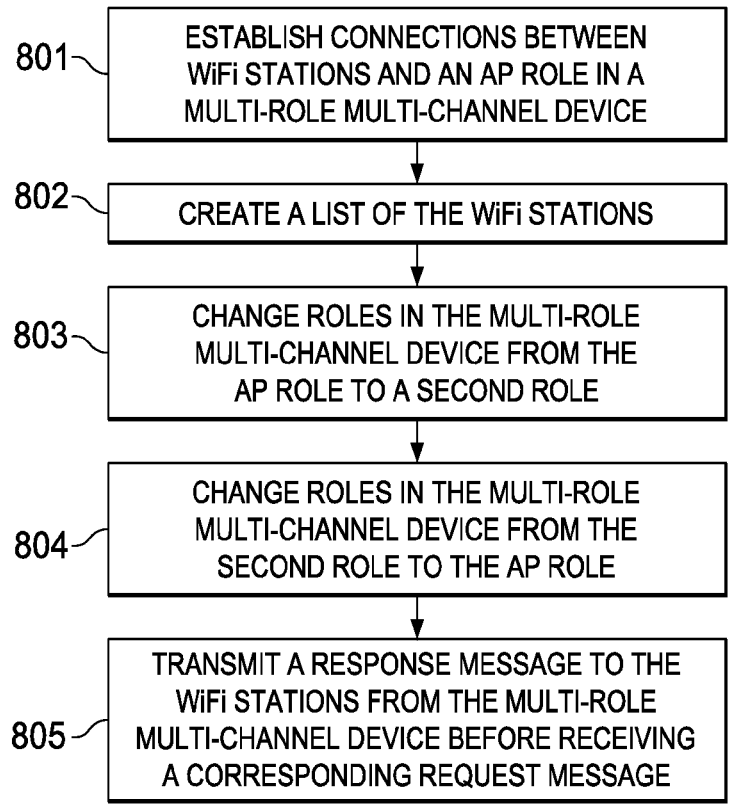

FIG. 8 is a flowchart illustrating a process for connecting WiFi stations to an AP role in a multi-role multi-channel device.

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

A STA attaches to an AP during a scanning process or discovery process. The STA switches each 802.11-designated channel or band to discover whether there is an AP working on this channel. The channel scanning process can be accomplished in passive or active mode. With passive scanning, STA switches to each candidate channel and listens to periodic beacon frames from APs. An AP uses the beacon frame to announce its presence, its working channel, its BSSID and other parameters for STA access. The AP broadcasts its beacons periodically (typically every 100 ms). To get information about all the APs in a certain channel, the STA has to stay in the channel for at least a beacon period. With active scanning, each STA broadcasts Probe Requests in each candidate channel and waits for Probe Responses from APs working on that channel. An AP sends unicast Probe Response to the STA after receiving the Probe Request. The Probe Response frame carries the same parameters as in the beacon frame. After scanning all candidate channels, using passive or active scanning, the STA selects an AP to perform authentication and association processes.

FIG. 1 illustrates a multi-role multi-channel device 101 that is operating in a STA role and is connected to AP 102 in WLAN0 103. In the STA role, multi-role multi-channel device 101 communicates on channel 0 for the band associated with WLAN0. In other roles, multi-role multi-channel device 101 may act as another STA or as an AP, such as an AP for STA1 104 or STA2 105.

FIG. 2 illustrates multi-role multi-channel device 101 operating in an AP role (AP1) and communicates with STA1 104 in WLAN1 201. In the AP1 role, multi-role multi-channel device 101 communicates on channel 1 for the band associated with WLAN1. In the AP1 role, multi-role multi-channel device 101 may also communicate with other STAs (not shown) on channel1.

FIG. 3 illustrates multi-role multi-channel device 101 operating in an AP role (AP2) and communicates with STA2 105 in WLAN1 301. In the AP2 role, multi-role multi-channel device 101 communicates on channel 2 for the band associated with WLAN2. Like the AP1 role, multi-role multi-channel device 101 may also communicate with other STAs (not shown) on channel2 in the AP2 role.

FIG. 4 illustrates a configuration in which multi-role multi-channel device 101 operates in dual AP roles. In a first AP role (AP1), multi-role multi-channel device 101 communicates with STA1 104 in WLAN1 401. In the AP1 role, multi-role multi-channel device 101 communicates on channel 1 for the band associated with WLAN1 401. In a second AP role (AP2), multi-role multi-channel device 101 communicates with STA2 105 in WLAN1 402. In the AP2 role, multi-role multi-channel device 101 communicates on channel 2 for the band associated with WLAN2 402. Multi-role multi-channel device 101 may also communicate with other STAs (not shown) in either the AP1 or AP2 roles.

FIG. 5 illustrates a configuration in which multi-role multi-channel device 101 operates in both AP and STA roles. When operating in the STA role, multi-role multi-channel device 101 is connected to AP 102 in WLAN0 501. In the STA role, multi-role multi-channel device 101 communicates on channel 0 for the band associated with WLAN0 501. In a first AP role (AP1), multi-role multi-channel device 101 communicates with STA1 104 in WLAN1 502. In the AP1 role, multi-role multi-channel device 101 communicates on channel1 for the band associated with WLAN1 502. In a second AP role (AP2), multi-role multi-channel device 101 communicates with STA2 105 in WLAN1 503. In the AP2 role, multi-role multi-channel device 101 communicates on channel2 for the band associated with WLAN2 503. Multi-role multi-channel device 101 may also communicate with other STAs (not shown) in either the AP1 or AP2 roles.

An AP device is generally required to stay on the designated channel for the associated WLAN. This ensures that the AP is discoverable by STAs and is available to support communications in the WLAN. This prevents the AP device from turning off, going to a sleep, entering a power-saving mode, or changing channels.

When operating in an AP role, multi-role multi-channel device 101 may occasionally need to change to a STA role, or to another AP role on another channel. For example, multi-role multi-channel device 101 may switch from AP1 role (FIG. 2) to STA role (FIG. 1) or to AP2 role (FIG. 3) on the same or a different channel. When multi-role multi-channel device 101 has temporarily left AP1 role, any STA in WLAN1 looking for AP1 during that time will not be able to reconnect with multi-role multi-channel device 101. As a result, the STA will begin scanning channels for a new AP.

In one embodiment, the multi-role multi-channel device 101 addresses this discoverability problem by assuming that one or more STAs have attempted to connect to the AP role while it was acting in a different role and/or was operating on a different channel. Accordingly, when multi-role multi-channel device 101 returns to the AP role, it transmits a Probe Response to a group of known STAs. For example, the multi-role multi-channel device 101 may transmit the Probe Response to a white list of STAs. The white list may include the STAs that connected within a set time period, such as within the last day, week, month, etc., or the last x number of STAs that connected to the AP role, such as the last 10, 50, 100, or all the STAs that have attached to the AP role.

FIG. 6 illustrates messages exchanged with an AP role 601 of a multi-role multi-channel device 602 according to one embodiment. AP role 601 is discovered by STA 603 establishes communications 606. Similarly, AP role 601 is discovered by STA 604 establishes communications 607. The multi-role multi-channel device may have also been in communication with other devices, such as STA 605, at other times. At some point 608, the multi-role multi-channel device changes from AP role 601 to another role, such as a STA role 609, another AP role, or a peer-to-peer role, or enters a power saving mode, such as a sleep or low-power state. While the multi-role multi-channel device is operating in another role, AP role 601 is unavailable during period 608.

In an example embodiment, STA 604 and 605 are disconnected from AP role 601 on multi-role multi-channel device 602 prior to period 608. While AP role 601 is not active during period 608, STAs 603-605 may attempt to communicate with the multi-role multi-channel device by sending messages, such as Probe Requests 610, 611. Because the multi-role multi-channel device is acting in a different role, AP role 601 is unaware of the requests that may have been received during period 608. Accordingly, AP role 601 does not respond to requests 610, 611.

When the multi-role multi-channel device 602 returns to AP role 601 after period 608, it assumes that all of the STAs on a white list have attempted to contact it. The multi-role multi-channel device 602 may maintain, for example, a white list containing all the stations 603-605 that were previously connected successfully to the AP role 601. AP role 601 generates a series of Probe Response messages 612-614 directed to each STA 603-605 on the white list. Any of the STAs that were attempting to contact AP role 601 would interpret the Probe Response (e.g., 612-614) as corresponding to the Probe Request (e.g., 610, 611) the STA sent during period 608. As a result, if one of the STAs 603-605 would like to connect to the AP role 601, that STA can complete the connection process easily.

FIG. 7 is a block diagram of a multi-role multi-channel device 701 according to one embodiment of the invention. In example embodiments, device 701 may be a portable computers (e.g., notebook computers, tablet computers, etc.), mobile terminal, such as a mobile telephone, smartphone, Personal Digital Assistant (PDA), E-Book, digital camera, portable gaming device, or any portable electronic device.

Device 701 comprises a controller 702 that controls the overall operation of device 701. Controller 702 may switch and control operation of device 701 depending on user inputs received through an input unit 703 or display 704.

Input unit 703 may include alphanumeric keys needed to input numeric and text information and function keys needed to set various functions, or may include a touch pad. Display 704 may include a Liquid Crystal Display (LCD) or a Light Emitting Diode (LED) device that outputs various display information generated by device 701 and controller 702. When a display 704 has a capacitive or resistive touch screen, display 704 may operate as an input unit for controlling device 701. In such a case, input unit 703 may include a minimum number of predetermined keys, and the display 704 may partially replace the key input function of the key input unit 703. Input unit 703 may also include an audio processor or a coder/decoder (codec) (not shown) for processing audio signals, such as voice and multimedia files.

A memory 705 may include program memory and/or data memory. Program memory stores programs for controlling the overall operation of device 701. Data memory may store information collected during the operation of the device. Memory 705 may further comprise internal and/or external memory, such as Hard Disk Drive (HDD), Solid State Disk (SSD), Compact Flash (CF), Secure Digital (SD), Micro Secure Digital (Micro-SD), Mini Secure Digital (Mini-SD), Extreme Digital (xD), memory stick, and the like.

Wireless transceiver 706 is a Radio Frequency (RF) unit that includes an RF transmitter for up-converting a frequency of transmission signals and amplifying the up-converted transmission signals, and an RF receiver for low-noise-amplifying received signals and down-converting a frequency of the amplified signals. Wireless transceiver 906 may also include a modulator/demodulator (modem) (not shown) that includes a transmitter for coding and modulating transmission signals and a receiver for demodulating and decoding signals received from the RF unit.

Network interface 707 provides a wired connection, such as an Ethernet connection, to connect device 701 to a network, such as Internet 708, an intranet, or LAN. Network interface 707 may support, for example, a CAT5 or CAT6 based connection.

WiFi module 709 provides short-range wireless communication operations based on the IEEE 802.11 standard. Using WiFi module 709, device 701 may form or join a wireless network or WLAN. WiFi module 709 supports data exchange with other WiFi devices in a WLAN. The controller 702 acquires device information for other WiFi devices to form a WLAN by means of WiFi module 709.

FIG. 8 is a flowchart illustrating a process for connecting WiFi stations to an AP role in a multi-role multi-channel device. In step 801, connections are established between one or more WiFi stations and the AP role in the multi-role multi-channel device. The AP role and the WiFi stations may communicate using an IEEE 802.11 protocol in one embodiment; however, it will be understood that other protocols may be used in other embodiments. In step 802, a list of the WiFi stations are created. The stations on the list may comprise stations to which the multi-role multi-channel device was connected to during a predetermined period of time or the stations to which the multi-role multi-channel device was most recently connected.

In step 803, the multi-role multi-channel device changes from the AP role to a second role. After operating in the second role for a period of time, the multi-role multi-channel device changes from the second role back to the AP role in step 804. The second role may correspond to a second AP role, a station role, a peer-to-peer role, a power-saving mode, a sleep mode, an inactive mode, or any other role, mode, or status other than the original AP role. In some embodiments, the multi-role multi-channel device also changes channels from a first channel that is assigned to the AP role to a second channel assigned to the second role and then back to the first channel.

After returning to the AP role, in step 805, the multi-role multi-channel device transmits a response message to the WiFi stations on the list before receiving a corresponding request message from the stations. For example, the request message may correspond to a probe request and the response message may correspond to a unicast probe response message. In one embodiment, the multi-role multi-channel device transmits the response message to WiFi stations on the list that it knows have been disconnected. The multi-role multi-channel device may determine that certain stations disconnected before the change from the AP role to a second role. When the multi-role multi-channel device returns to the AP role, it may send response messages only to stations known to have disconnected. This avoids sending response messages to stations that were still connected before the multi-role multi-channel device temporarily left the AP role. In other embodiments, the multi-role multi-channel device may transmit response messages to all WiFi stations on the list in case any of the stations disconnected and attempted to reconnect during the period that the multi-role multi-channel device was in the second role.

It will be understood that in various embodiments, the blocks or modules shown in the figures may represent hardware, sets of software routines, logic functions, and/or data structures that are configured to perform specified operations. Although these modules are shown as distinct logical blocks, in other embodiments at least some of the operations performed by these modules may be combined in to fewer blocks. Conversely, any given one of the modules shown in the figures may be implemented such that its operations are divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:
1. A method of connecting stations to an access point (AP) role in a multi-role multi-channel device, the method comprising:
    establishing connections between one or more stations and the AP role in the multi-role multi-channel device;

changing roles in the multi-role multi-channel device from the AP role to a second role and then back to the AP role; and sending response messages to the one or more stations from the multi-role multi-channel device after returning to the AP role and before receiving corresponding request messages from the one or more stations.

2. The method of claim 1, further comprising:
creating a list of the one or more stations; and
sending the response message to the stations on the list.

3. The method of claim 2, wherein the stations on the list comprise stations to which the multi-role multi-channel device was connected to during a predetermined period of time.

4. The method of claim 2, wherein the stations on the list comprise a predetermined number of stations to which the multi-role multi-channel device was most recently connected.

5. The method of claim 1, wherein the AP role and the stations communicate using an IEEE 802.11 protocol.

6. The method of claim 1, wherein the request message corresponds to a probe request and the response message corresponds to a unicast probe response message.

7. The method of claim 1, wherein the second role corresponds to one of a second AP role, a station role, and a peer-to-peer role.

8. The method of claim 1, wherein the second role corresponds to a one of a power-saving mode, a sleep mode, and an inactive mode.

9. The method of claim 1, wherein changing roles in the multi-role multi-channel device further comprises changing channels from a first channel assigned to the AP role to a second channel and then back to the first channel.

10. A signal processor circuit enabled to provide communications between a multi-role multi-channel device and one or more stations, the signal processor circuit comprising:
a controller configured to establish a connection between one or more stations and an access point (AP) role in the multi-role multi-channel device and to change roles in the multi-role multi-channel device from the AP role to a second role and then back to the AP role; and
a WiFi module configured to transmit a response message to the one or more stations from the multi-role multi-channel device after returning to the AP role and before receiving a corresponding request message from the one or more stations.

11. The signal processor circuit of claim 10, wherein the controller is further configured to create a list of the one or more stations; and wherein the WiFi module is further configured to transmit the response message to the stations on the list.

12. The signal processor circuit of claim 10, wherein the stations on the list comprise stations to which the multi-role multi-channel device was connected to during a predetermined period of time.

13. The signal processor circuit of claim 10, wherein the stations on the list comprise a predetermined number of stations to which the multi-role multi-channel device was most recently connected.

14. The signal processor circuit of claim 10, wherein the AP role and the stations communicate using an IEEE 802.11 protocol.

15. The signal processor circuit of claim 14, wherein the request message corresponds to a probe request and the response message corresponds to a unicast probe response message.

16. The signal processor circuit of claim 10, wherein the second role corresponds to one of a second AP role, a station role, and a peer-to-peer role.

17. The signal processor circuit of claim 10, wherein the second role corresponds to a one of a power-saving mode, a sleep mode, and an inactive mode.

18. The signal processor circuit of claim 10, wherein changing roles in the multi-role multi-channel device further comprises changing channels from a first channel assigned to the AP role to a second channel and then back to the first channel.

19. A method of connecting stations to an access point (AP) role in a multi-role multi-channel device, the method comprising:
establishing a connection between at least one station and the AP role in the multi-role multi-charnel device;
creating a list of the at least one stations;
changing roles in the multi-role multi-channel device from the AP role to a second role;
changing roles in the multi-role multi-channel device from the second role back to the AP role;
after returning to the AP role, transmitting a response message to the at least one station on the list from the multi-role multi-channel device, the response message transmitted before receiving a corresponding request message from the at least one station.

20. The method of claim 19, wherein changing roles in the multi-role multi-channel device further comprises changing channels from a first channel assigned to the AP role to a second channel and then back to the first channel.

* * * * *